US007058487B2

(12) United States Patent
Hara et al.

(10) Patent No.: US 7,058,487 B2
(45) Date of Patent: Jun. 6, 2006

(54) CONTROL APPARATUS FOR HYBRID VEHICLE

(75) Inventors: Kazuhiro Hara, Kawachi-gun (JP); Masanobu Asakawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 18 days.

(21) Appl. No.: 10/914,139

(22) Filed: Aug. 10, 2004

(65) Prior Publication Data
US 2005/0038576 A1 Feb. 17, 2005

(30) Foreign Application Priority Data
Aug. 12, 2003 (JP) ............................. 2003-292170

(51) Int. Cl.
*B60K 6/04* (2006.01)
*B60L 11/14* (2006.01)
*F02D 29/02* (2006.01)
*F02D 29/06* (2006.01)
*G06F 7/00* (2006.01)

(52) U.S. Cl. ............................................. 701/22; 701/1
(58) Field of Classification Search ............ 701/51–54, 701/22, 111, 115; B60K 6/04; B60L 11/14; G06F 7/00; B61B 13/00
See application file for complete search history.

(56) References Cited

U.S. PATENT DOCUMENTS

| 3,937,148 A | * | 2/1976 | Simpson | ..................... 104/283 |
| 4,143,314 A | * | 3/1979 | Gruber | ...................... 323/288 |
| 4,811,667 A | * | 3/1989 | Morishita et al. | ............ 104/284 |
| 4,924,778 A | * | 5/1990 | Morishita et al. | ............ 104/284 |
| 4,967,670 A | * | 11/1990 | Morishita et al. | ............ 104/284 |
| 5,097,803 A | * | 3/1992 | Galvin | ........................... 123/3 |
| 5,343,780 A | * | 9/1994 | McDaniel et al. | ........... 477/108 |
| 5,467,718 A | * | 11/1995 | Shibata et al. | ............... 104/284 |

(Continued)

FOREIGN PATENT DOCUMENTS

GB 2187346 A * 9/1987

(Continued)

OTHER PUBLICATIONS

Mimpei Morishita et al., Zero power control of electromagnetic levitation system, Electrical Enginnering in Japan, v 108 n 3 May-Jun. 1988, pp. 111-120 (from Dialog(R) File 8, acc. No. 02713282).*

*Primary Examiner*—Cuong Nguyen
(74) *Attorney, Agent, or Firm*—Arent Fox PLLC

(57) ABSTRACT

In a control apparatus for a hybrid vehicle which is able to travel under the driving force from at least one of an internal-combustion engine E and a drive motor connected to the internal-combustion engine, when an FI/AT/MGECU and a MOTECU execute motor damping which generates a torque for suppressing the torque vibration of the internal-combustion engine, in the motor M, the MOTECU corrects a motor torque calculating battery terminal current value obtained by multiplying an input-output current ABAT of the battery, by an offset value corresponding to the motor damping, and executes zero power control based on the corrected motor torque calculating battery current value. As a result, the input and output power of the power storage unit are accurately balanced and overcharge or overdischarge of the battery based on the input-output current ABAT of the battery including errors due to the damping control or the motor torque calculating battery current value, is avoided.

3 Claims, 8 Drawing Sheets

U.S. PATENT DOCUMENTS

| | | | | |
|---|---|---|---|---|
| 5,477,788 A | * | 12/1995 | Morishita | 104/284 |
| 5,566,774 A | * | 10/1996 | Yoshida | 180/65.4 |
| 5,909,094 A | * | 6/1999 | Yamada et al. | 318/140 |
| 6,018,694 A | * | 1/2000 | Egami et al. | 701/102 |
| 6,019,183 A | * | 2/2000 | Shimasaki et al. | 180/165 |
| 6,158,537 A | * | 12/2000 | Nonobe | 180/65.3 |
| 6,202,782 B1 | * | 3/2001 | Hatanaka | 180/301 |
| 6,234,932 B1 | * | 5/2001 | Kuroda et al. | 477/3 |
| 6,278,915 B1 | * | 8/2001 | Deguchi et al. | 701/22 |
| 6,367,570 B1 | * | 4/2002 | Long et al. | 180/65.2 |
| 6,408,968 B1 | * | 6/2002 | Wakashiro et al. | 180/65.3 |
| 6,408,987 B1 | * | 6/2002 | Morishita | 187/292 |
| 6,672,415 B1 | * | 1/2004 | Tabata | 180/65.2 |
| 6,684,794 B1 | * | 2/2004 | Fiske et al. | 104/281 |
| 6,727,676 B1 | * | 4/2004 | Ochiai | 320/104 |
| 6,810,977 B1 | * | 11/2004 | Suzuki | 180/65.2 |
| 6,966,803 B1 | * | 11/2005 | Hara et al. | 440/6 |
| 6,983,701 B1 | * | 1/2006 | Thornton et al. | 104/282 |
| 2001/0039230 A1 | * | 11/2001 | Severinsky et al. | |
| 2002/0082754 A1 | * | 6/2002 | Robichaux et al. | |
| 2002/0113440 A1 | * | 8/2002 | Kimura et al. | |
| 2002/0117858 A1 | * | 8/2002 | Hanyu et al. | |
| 2002/0173401 A1 | * | 11/2002 | Bowen | |
| 2002/0179047 A1 | * | 12/2002 | Hoang et al. | |
| 2003/0009270 A1 | * | 1/2003 | Breed | |
| 2003/0217668 A1 | * | 11/2003 | Fiske et al. | 104/282 |
| 2004/0128054 A1 | * | 7/2004 | Jaliwala et al. | 701/104 |
| 2004/0236483 A1 | * | 11/2004 | Kimura | 701/22 |
| 2005/0038576 A1 | * | 2/2005 | Hara et al. | 701/22 |

FOREIGN PATENT DOCUMENTS

| | | | |
|---|---|---|---|
| JP | 61-66818 | | 5/1986 |
| JP | 4-191897 | * | 7/1992 |
| JP | 4-191898 | * | 7/1992 |
| JP | 4-197342 | * | 7/1992 |
| JP | 11-230914 | * | 8/1999 |
| JP | 2000-023582 | * | 2/2000 |
| JP | 2000-110709 | * | 4/2000 |

* cited by examiner

CONTROL APPARATUS FOR HYBRID VEHICLE

BACKGROUND OF THE INVENTION

1. Field of the Invention

The present invention relates to a control apparatus for a hybrid vehicle which is able to travel under the driving force from at least one of an engine and a drive motor connected to the engine.

This application is based on Japanese Patent Application No. 2003-292170, the contents of which are incorporated herein by reference.

2. Description of Related Art

Conventionally, for example, there has been a torque fluctuation control unit for suppressing engine torque fluctuation comprising; a power generation unit which applies a counter torque to a crankshaft driven by the engine, and an electrical drive unit which applies a positive torque to the crankshaft. In this unit, during an all cylinders operation or a partial cylinders operation of the engine, then synchronized with periodic fluctuations of torque generated in the respective crankshafts, the power generation unit is operated when the torque is increasing and the electrical drive unit is operated when the torque is decreasing, so that a torque counter to the engine torque fluctuations is applied in order to suppress the engine torque fluctuation. During the partial cylinders operation, by making the operation time of the power generation unit or the electrical drive unit longer than the operation time during the all cylinders operation, the torque fluctuation of the engine may be more strongly suppressed (for example, see Japanese Unexamined Patent Application, First Publication No. Sho. 61-66818).

Incidentally, in a hybrid vehicle which is able to travel under the driving force from at least one of an engine and a drive motor to realize low pollution and high fuel efficiency, there has been a problem in that, if more apparatuses are provided in addition to the apparatus originally necessary for the vehicle to travel, the vehicle becomes complicated, and not only is cost increased but also the vehicle becomes larger than necessary, causing a deterioration in fuel consumption efficiency. Therefore, in a hybrid vehicle, by not providing the power generation unit and the electrical drive unit as in the conventional technology, but using a drive motor connected to the engine, instead of the power generation unit and the electrical drive unit, a damping control which generates the torque for suppressing the engine torque vibration is executed in the drive motor.

However, if the damping control is executed by the drive motor, there is a likelihood that, depending on the damping torque amplification or the frequency of the damping control, errors may be generated in a zero power control which balances the input power and the output power in the power storage unit which stores the power for driving the drive motor, causing overcharge or overdischarge in the power storage unit. Conventionally, in order to avoid such overcharge or overdischarge in the power storage unit, control such as stopping the damping control by the drive motor after a prescribed time has been performed. However, there is a problem in that after stopping the damping control, due to the noise and the vibration caused by the engine torque vibration, marketability is impaired.

SUMMARY OF THE INVENTION

The present invention takes the above problems into consideration, with an object of providing a control apparatus for a hybrid vehicle which can suppress the engine torque vibration while protecting the power storage unit.

In order to solve the above problems, a control apparatus for a hybrid vehicle according to a first aspect of the invention is a control apparatus for a hybrid vehicle which is able to travel under the driving force from at least one of an engine (for example, an internal-combustion engine E in an embodiment described later) and a drive motor connected to the engine (for example, a motor M in an embodiment described later), comprising: a power storage unit which stores power for driving the drive motor (for example, a battery 3 in an embodiment described later); a damping control device which executes damping control which generates a torque for suppressing torque vibration of the engine, in the drive motor (for example, a damping phase-amplitude calculating section 100 and a motor torque calculating section 101 included in an FI/AT/MGECU 36 and a MOTECU 33 in an embodiment described later); and a power control device which executes zero power control which balances an input power and an output power of the power storage unit based on an input-output current value of the power storage unit, when the damping control device executes the damping control (for example, the processing from step ST 21 to step ST 27 executed in the MOTECU 33 in an embodiment described later).

In the control apparatus for a hybrid vehicle comprising the above construction, when the damping control device executes the damping control which generates the torque for suppressing the engine torque, in the drive motor, the power control device executes the zero power control which balances the input power and the output power in the power storage unit based on the input-output current value of the power storage unit, so that the overcharge or overdischarge in the power storage unit can be avoided.

A control apparatus for a hybrid vehicle according to a second aspect of the invention, is characterized in that in the control apparatus for a hybrid vehicle according to the first aspect, the power control device offset corrects the input-output current value of the power storage unit, when the damping control device executes the damping control.

In the control apparatus for a hybrid vehicle comprising the above construction, when the damping control device executes the damping control which generates the torque for suppressing the engine torque vibration, in the drive motor, the power control device offset corrects the input-output current value of the power storage unit, and executes the zero power control based on the input-output current value so that the input and output power of the power storage unit may be accurately balanced.

A control apparatus for a hybrid vehicle according to a third aspect of the invention, is characterized in that in the control apparatus for a hybrid vehicle according to either one of the first and second aspects, the power control device stops multiplication processing with respect to the input-output current value of the power storage unit, in the case where there are no charge instructions with respect to the power storage unit, and the damping control device executes the damping control.

In the control apparatus for a hybrid vehicle comprising the above construction, in the case where there is no charge instructions with respect to the power storage unit, and the damping control device executes the damping control, by stopping the unnecessary multiplication processing with respect to the input-output current value of the power storage unit including errors due to the damping control, the power of the power storage unit may be kept from being wasted.

According to the control apparatus for a hybrid vehicle of the present invention, when the damping control device executes the damping control which generates the torque for suppressing the engine torque, in the drive motor, the power control device offset corrects the input-output current value of the power storage unit and executes the zero power control based on the corrected input-output current value so that the input and output power of the power storage unit can be accurately balanced, and the overcharge or overdischarge in the power storage unit based on the input-output current value of the power storage unit including errors due to the damping control, can be avoided. Moreover, by stopping the unnecessary multiplication processing with respect to the input-output current value of the power storage unit including errors due to the damping control, the power of the power storage unit can be kept from being wasted.

Accordingly, the effect is obtained where it is possible to realize a control apparatus for a hybrid vehicle wherein the torque vibration of the engine is suppressed while protecting the power storage unit, and deterioration in marketability due to the noise and the vibration caused by the torque vibration of the engine is prevented.

DETAILED DESCRIPTION OF THE INVENTION

Hereunder is a description of an embodiment of the present invention with reference to the drawings.

(Overall Construction)

Figure 1:
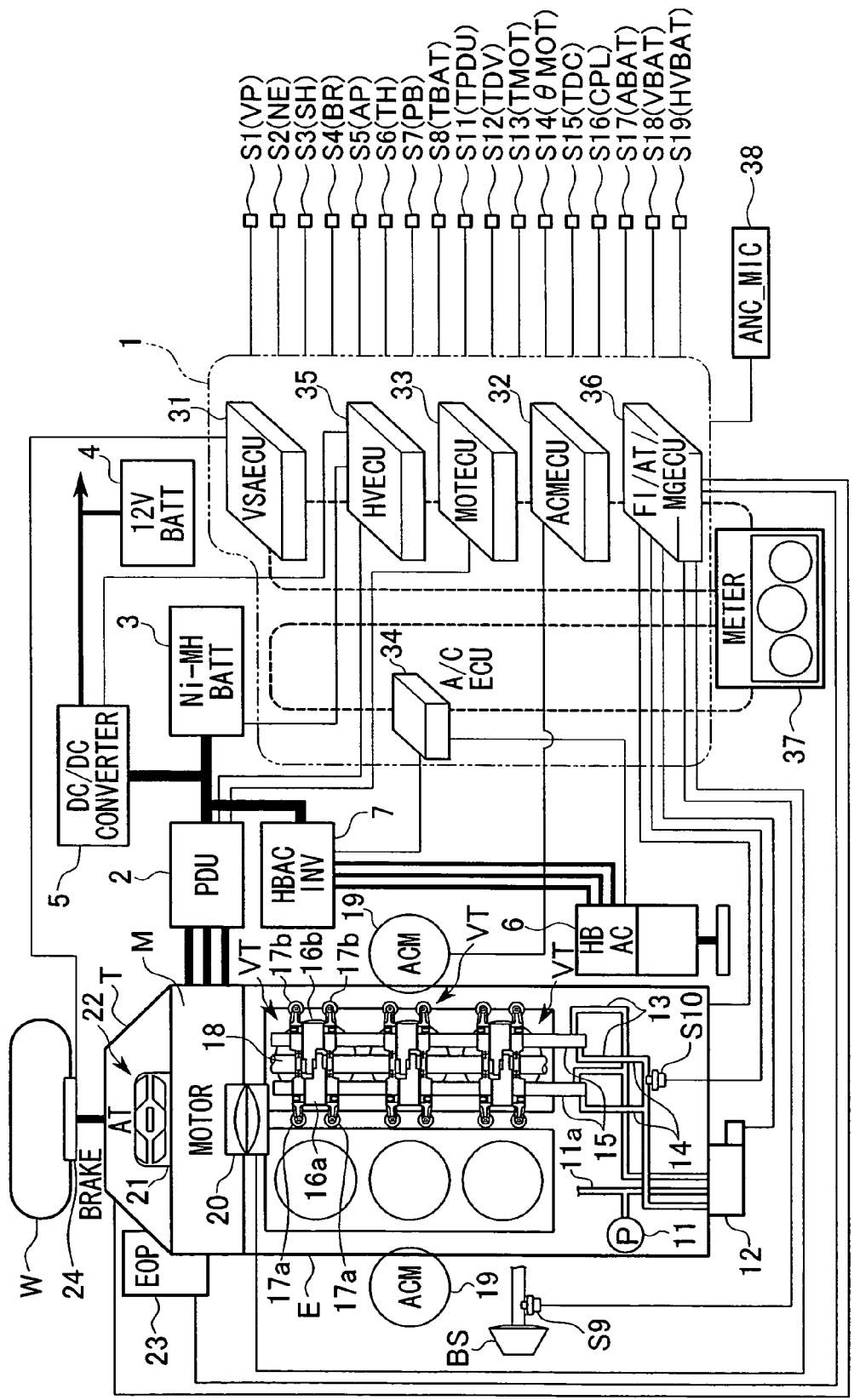
FIG. 1 shows a construction of a parallel hybrid vehicle according to a control apparatus for a hybrid vehicle of an embodiment of the present invention.

FIG. 1 shows the construction of a parallel hybrid vehicle according to a control apparatus for a hybrid vehicle of an embodiment of the present invention. The parallel hybrid vehicle comprises a construction where an internal-combustion engine E, a motor M, and a transmission T are connected directly in series. In FIG. 1, the driving force of both the internal-combustion engine E and the motor M is transmitted, for example, from the transmission T such as an automatic transmission (AT) or manual transmission (MT), to the driving wheels W of the vehicle, via a differential gear (not shown) which distributes the driving force between driving wheels W on the right and the left (front wheels or rear wheels). Moreover, when a driving force is transmitted from the driving wheel W side to the motor M side at the time of deceleration of the hybrid vehicle, the motor M functions as a generator to generate so-called regenerative braking, and the kinetic energy of the vehicle body is recovered as electrical energy.

The motor M, being for example a three-phase brushless DC motor or the like, is connected to a power drive unit (PDU) 2. The power drive unit 2 comprises, for example a bridge circuit being a bridge connected using a plurality of transistor switching elements, and a PWM inverter which drives the motor M by pulse width modulation (PWM), and is connected to a nickel-hydrogen battery (hereunder, battery) 3 of a high voltage system (for example, a 144 [V] system) which transfers the power for the motor M (the power supply which is supplied to the motor M during the power running operation (driving or assisting) of the motor M, or the regenerated power which is output from the motor M during the regenerative operation). Moreover, the drive and regenerative operation are performed by the power drive unit 2 receiving control instructions from a control unit 1. That is, for example when driving the motor M, based on torque instructions input from the control unit 1, the power drive unit 2 converts the DC power output from the battery 3 into three-phase AC power and supplies this to the motor M. On the other hand, during the regenerative operation of the motor M, the three-phase AC power output from the motor M is converted into the DC power and the battery 3 is charged.

Furthermore, an auxiliary battery 4 of a low voltage system (for example, 12 [V] system) for driving various accessories, is connected to the power drive unit 2 and the battery 3 in parallel via a downverter 5 which is a DC—DC converter. The downverter 5 is controlled by the control unit 1 and charges the auxiliary battery 4 by lowering the voltage of the power drive unit 2 or the battery 3.

Moreover, a crankshaft of the internal-combustion engine E is connected, for example through a belt or a clutch to a rotation shaft of an air conditioning motor (not shown) equipped in a hybrid air conditioning compressor (HBAC) 6. This air conditioning motor is connected to an air conditioning inverter (HBAC INV) 7. The air conditioning inverter 7 is connected in parallel to the power drive unit 2 and the battery 3, and under the control of the control unit 1, converts the DC power output from the power drive unit 2 and the battery 3 into three-phase AC power to supply to the air conditioning motor so as to drive control the hybrid air conditioning compressor 6.

That is, in the hybrid air conditioning compressor 6, the driving load, for example the discharge of the refrigerant, is variably controlled under the driving force from at least one of the internal-combustion engine E and the air conditioning motor during the power running operation of the air conditioning motor. Here, "hybrid" in the hybrid air conditioning compressor 6 means that it can be driven by either one of the internal-combustion engine E and the motor M.

Between the internal-combustion engine E and the air conditioning motor, there are for example, a crankshaft pulley integrally provided with the crankshaft of the internal-combustion engine E, a driving shaft pulley paired with the crankshaft pulley and integrally provided with a driving shaft connectable with the rotation shaft of the air conditioning motor through a clutch, and a belt spanning between the crankshaft pulley and the driving shaft pulley. That is, between the crankshaft pulley and the driving shaft pulley, the driving force is transmitted through the belt.

Moreover, the internal-combustion engine E is a so-called SOHC V6 cylinder engine, of a construction having three cylinders on one bank comprising a variable valve timing mechanism VT enabling a cylinder deactivation operation, and a construction having three cylinders on the other bank comprising a normal valve operating mechanism (not shown) which does not perform the cylinder deactivation operation. Furthermore, the three cylinders enabling the cylinder deactivation operation have a construction such that respective two inlet valves and two exhaust valves are able to maintain the closed state by means of the variable timing mechanism VT, via an oil pressure pump 11, a spool valve 12, a cylinder deactivation side path 13, and a cylinder deactivation cancellation side path 14. That is, the internal-combustion engine E may be switched between three cylinders operation (cylinder deactivation operation) in the state such that the three cylinders on one side bank are deactivated, and six cylinders operation (all cylinders operation) such that all six cylinders on both side banks are driven.

Specifically, if operating oil being supplied from the oil pressure pump 11 through the lubrication system piping 11a to the engine lubrication system is partially supplied via the spool valve 12 comprising a solenoid controlled by the control unit 1, to the cylinder deactivation side path 13 on the bank capable of cylinder deactivation operation, a cam lift rocker arm 16a (16b) and valve drive rocker arms 17a (17b) which are supported on the respective rocker shafts 15 and were integrally driven, are able to be driven separately. Therefore, the driving forces of the cam lift rocker arms 16a and 16b driven by the rotation of the cam shaft 18 are not transmitted to the valve drive rocker arms 17a and 17b, so that the inlet valves and the exhaust valves remain in the closed state. Accordingly the cylinder deactivation operation where the inlet valves and the exhaust valves of the three cylinders become in the closed state may be performed. The internal-combustion engine E is mounted via a damping device (ACM: Active Control Engine Mount) 19 onto the vehicle so that the damping device 19 can suppress the generation of vehicle vibration accompanied with the operating state of the internal-combustion engine E, that is the switching of the three cylinders operation (cylinder deactivation operation) and the six cylinders operation (all cylinders operation).

Moreover, this internal-combustion engine E comprises an electronic throttle control system (ETCS) 20 which electronically controls a throttle valve (not shown).

The ETCS 20 drives an ETCS driver according to the throttle opening calculated in the control unit 1 based for example on the accelerator pedal opening AP related to the operating amount of the accelerator pedal (not shown) by a driver, the operating state of the vehicle such as the vehicle travelling speed (vehicle speed) VP or the engine speed NE, and on the torque distribution between the internal-combustion engine E and the motor M, so as to directly control the throttle valve.

Moreover, for example the transmission T being the automatic transmission (AT) is constructed to comprise a torque converter 22 equipped with a lock-up clutch (LC) 21, and an electric oil pump 23 which generates the oil pressure for drive controlling the torque converter 22 and for the shifting operation of the transmission T. The electric oil pump 23 is drive controlled by the control unit 1 with the power supply from the battery 3.

The torque converter 22 transmits the torque by a spiral flow of the operating oil (ATF: Automatic Transmission Fluid) enclosed inside. In an LC_OFF state where the engagement of the lock-up clutch 21 is cancelled, the torque is transmitted (for example, amplification transmission) from the rotation shaft of the motor M to the input shaft of the transmission T via the operating oil. On the other hand, in an LC_ON state where the lock-up clutch 21 is set up in the engagement state, the rotation driving force is directly transmitted from the rotation shaft of the motor M to the input shaft of the transmission T and not via the operating oil.

Furthermore, a booster BS is linked to the brake pedal (not shown). A master power internal negative pressure sensor S9 which detects the brake master power internal negative pressure is provided in the booster BS.

Moreover, the driving wheel W comprises a brake device 24. The brake device 24 suppresses the generation of rapid behavioral change of the vehicle by control of the control unit 1. For example, it prevents slipping of the driving wheel W on a slippery road surface or the like, suppresses side slip such as oversteering or understeering, prevents the driving wheel W from being in a locked state during braking, ensures the desired driving force and the steering performance of the vehicle, stabilizes the posture of the vehicle, and assists with travelling by means of a creep force, for example, prevents the vehicle from moving backward on a slope when deactivating the internal-combustion engine E.

Inputs to the control unit 1 are for example: a detection signal from a vehicle speed sensor SI which detects the travelling speed of vehicle VP, a detection signal from an engine speed sensor S2 which detects the engine speed NE, a detection signal from a shift position sensor S3 which detects the shift position SH of the transmission T, a detection signal from a brake switch S4 which detects the operating state of brake (Br) pedal BR, and a detection signal from an accelerator pedal opening sensor S5 which detects the accelerator pedal opening AP according to the operation amount of the accelerator pedal.

Moreover, inputs to the control unit 1 are for example; a detection signal from a throttle opening sensor S6 which detects the throttle opening TH, a detection signal from an intake pipe pressure sensor S7 which detects the intake pipe negative pressure PB, a detection signal from a battery temperature sensor S8 which detects the temperature TBAT of the battery 3, a detection signal from the master power internal negative pressure sensor S9, and a detection signal from a POIL sensor S10 which detects the oil pressure of the cylinder deactivation cancellation side path 14 when deactivating the cylinders.

Furthermore, inputs to the control unit 1 are for example: a detection signal from a PDU temperature sensor S11 which detects the temperature TPDU of the power drive unit 2, a detection signal from a DV temperature sensor S12 which detects the temperature TDV of the downverter 5, a detection signal from a motor temperature sensor S13 which detects the temperature TMOT of the motor M, a detection signal from a rotation angle sensor S14 comprising a resolver which detects a rotor angle θMOT of the motor M, a detection signal (TDC pulse) from a crank angle sensor S15 which detects a compression top dead center TDC position of the piston of the internal-combustion engine E, and a detection signal from a cylinder internal pressure sensor S16 which detects the cylinder internal pressure CPL of the internal-combustion engine E.

Moreover, in addition, the inputs to the control unit 1 are for example: a detection signal from a battery current sensor S17 which detects an input-output current ABAT of the battery 3, a detection signal from a battery voltage sensor S18 which detects an input-output voltage VBAT of the battery 3, and a detection signal from an auxiliary battery voltage sensor S19 which detects an input-output voltage VBAT of the auxiliary battery 4.

Furthermore, the control unit 1 is connected with a sound concentrating microphone (ANC_MIC) 38 which concentrates the sound inside the vehicle interior in order to perform active noise control wherein a control frequency is detected based on the engine speed NE of the internal-combustion engine E, and a negative sound is output from a speaker linked to the vehicle on board audio equipment so as to effectively decrease the muffled sound during the cylinder deactivation operation.

Moreover, the control unit 1 comprises for example: a VSA (Vehicle Stability Assist) ECU 31 which drive controls the brake device 24 to stabilize the behavior of the vehicle, an ACMECU 32 which drive controls the damping device 19 to suppress the generation of car body vibration caused by the operating state of the internal-combustion engine E, a MOTECU 33 which controls the driving and the regenerative operation of the motor M, an A/CECU 34 which drive controls the air conditioning hybrid air conditioning compressor 6 and the air conditioning inverter 7, and an HVECU 35 which monitors and protects the high voltage electrical equipment system comprising for example the power drive unit 2, the battery 3, the downverter 5, and the motor M, and controls the operation of the power drive unit 2 and the downverter 5.

Moreover, the control unit 1 comprises: an FI/AT/MGECU 36 which controls for example the fuel supply and the ignition timing for the internal-combustion engine E. Also the FI/AT/MGECU 36 calculates the torque value required by a driver of the vehicle (driver required torque) based on the respective detection signals such as the accelerator pedal opening AP, the engine speed NE, the travelling speed of the vehicle VP, the shift position SH, and the operating state of the brake (Br) pedal BR, and controls the spool valve 12 of the internal-combustion engine E by calculating the torque distribution between the internal-combustion engine E and the motor M, and executing cylinder deactivation determination for determining whether the cylinder deactivation operation of the internal-combustion engine E should be executed or not. This is done while taking into consideration; the torque value required during constant speed travel control where the travelling speed of vehicle VP is controlled to a target vehicle speed, or during follow travel control for following the preceding vehicle while maintaining a predetermined vehicular gap, or a limit torque for protecting motor windings or required amount set according to the state of charge of the battery 3 and the auxiliary battery 4, and protecting the motor winding. The FI/AT/MGECU 36 further notifies the required torque for the motor M to the MOTECU 33, and controls the throttle opening of the ETCS 20 installed in the internal-combustion engine according to the calculated torque distribution.

The VSAECU 31, the ACMECU 32, the MOTECU 33, the A/CECU 34, the HVECU 35, and the FI/AT/MGECU 36 are mutually connected communicably. The respective ECUs 31 to 36 are connected to a meter 37 comprising instruments which display the amount of the respective types of states.

Next is a description of a damping (motor damping) operation using the motor M, for extending the time of the cylinder deactivation operation of the internal-combustion engine E, with reference to the drawings.

(Motor Damping Necessity Determination Processing)

Figure 2:
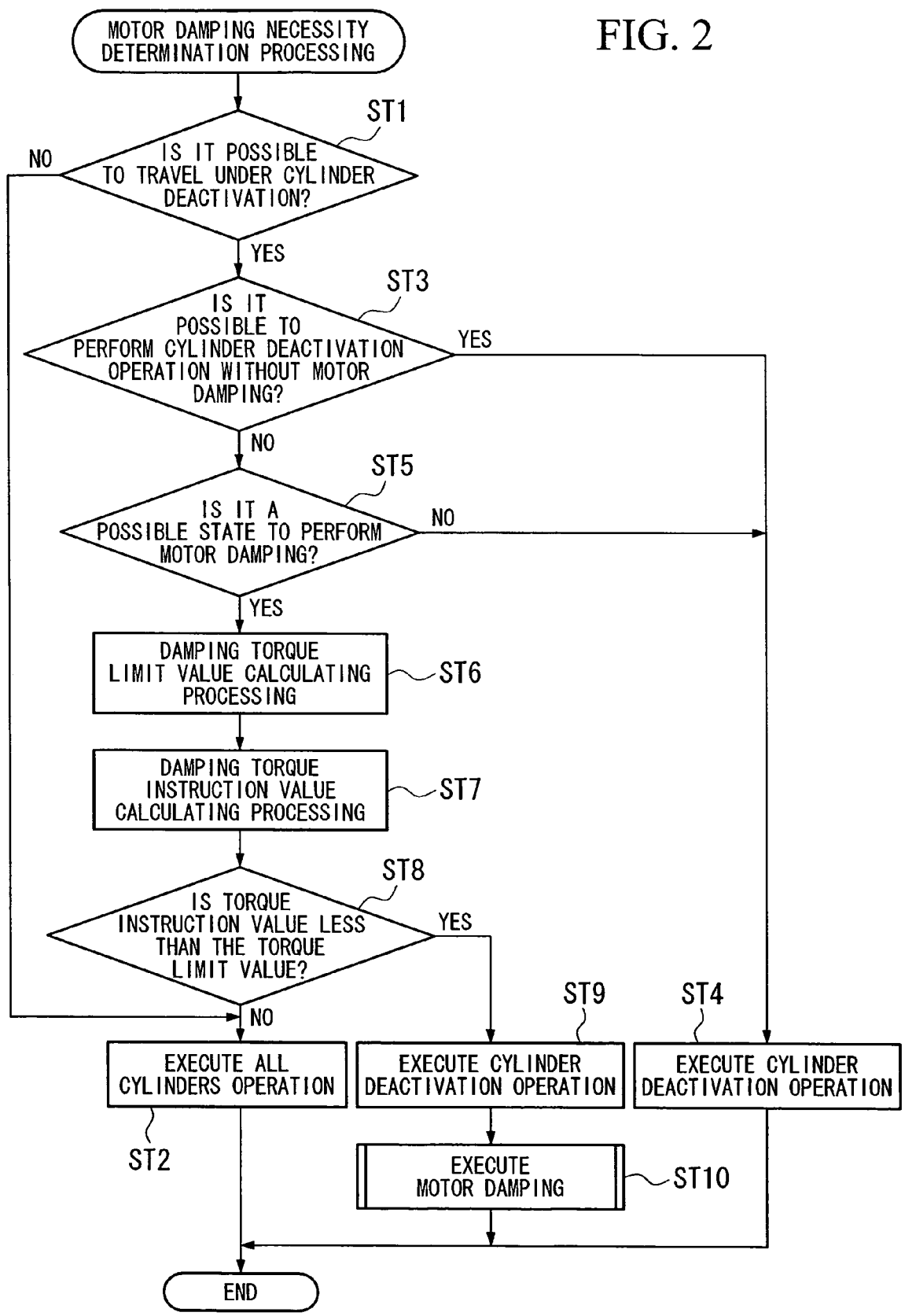
FIG. 2 is a flowchart showing an operation of motor damping necessity determination processing by a control unit in the control apparatus for a hybrid vehicle of the same embodiment.

First is a description of a motor damping necessity determination processing by the control unit 1, which determines if motor damping is necessary or not. FIG. 2 is a flowchart showing the operation of the motor damping necessity determination processing by the control unit 1, in the control apparatus for a hybrid vehicle of the present embodiment.

In FIG. 2, firstly, the FI/AT/MGECU 36 of the control unit 1 determines whether it is possible to travel under the cylinder deactivation operation of the internal-combustion engine E or not, from the torque value required by a driver of the vehicle (driver required torque), or the torque value required during the constant speed travel control which controls the travelling speed of vehicle VP so as to become the target vehicle speed, or during the follow travel control which follows the preceding vehicle while maintaining a predetermined vehicular gap (step ST 1).

In step ST 1, if it is impossible to travel under the cylinder deactivation operation of the internal-combustion engine E (NO in step ST 1), the FI/AT/MGECU 36 executes the all cylinders operation of the internal-combustion engine E (step ST 2).

On the other hand, if it is possible to travel under the cylinder deactivation operation of the internal-combustion engine E (YES in step ST 1), the FI/AT/MGECU 36 then determines whether or not it is possible to perform the cylinder deactivation operation of the internal-combustion engine E without motor damping, from the sound in the vehicle interior concentrated by the sound concentrating microphone 38, or from the vehicle conditions (step ST 3).

In step ST 3, if it is possible to perform the cylinder deactivation operation of the internal-combustion engine E without motor damping (YES in step ST 3), the FI/AT/MGECU 36 executes the cylinder deactivation operation of the internal-combustion engine E (step ST 4).

Moreover, in step ST 3, if it is not possible to perform the cylinder deactivation operation of the internal-combustion engine E without motor damping (NO in step ST 3), the FI/AT/MGECU 36 determines whether it is a possible state to perform motor damping or not, from the travelling speed of vehicle VP or the vehicle conditions (step ST 5).

In step ST 5, if it is not a possible state to perform motor damping (NO in step ST 5), the flow proceeds to step ST 4, and the FI/AT/MGECU 36 executes the cylinder deactivation operation of the internal-combustion engine E (step ST 4).

On the other hand, if it is a possible state to perform motor damping (YES in step ST 5), the MOTECU 33 executes the damping torque limit value calculating processing which calculates the limit value of the damping torque in the motor damping, considering the motor shaft driving torque which is limited following the temperature change of the battery 3 or the increasing temperature of the motor M (step ST 6).

Next, the MOTECU 33 executes the damping torque instruction value calculating processing which calculates the damping torque instruction value in the motor damping, taking into consideration: the damping torque request value for improving the torque vibration due to the engine torque of the internal-combustion engine E during the cylinder deactivation operation, which was calculated based on the control map from the engine speed NE of the internal-combustion engine E detected by the engine speed sensor S2 and the intake pipe negative pressure PB of the internal-combustion engine E detected by the intake pipe pressure sensor S7; the damping torque request value for improving the torque vibration due to the engine torque of the internal-combustion engine E during the cylinder deactivation operation, which was calculated based on the cylinder internal pressure CPL versus the damping torque request value characteristic from the cylinder internal pressure CPL of the internal-combustion engine E detected by the cylinder internal pressure sensor S16; the damping torque request value for improving the deterioration of the muffled sound level in the vehicle interior due to the internal-combustion engine E during the cylinder deactivation operation, which was calculated based on the microphone sound versus the damping torque request value characteristic from the sound in the vehicle interior concentrated by the sound concentrating microphone 38; and further the damping torque request value for compensating the decrease in the suppressing force of the vehicle vibration in the damping device 19 generated due to the decrease in the 12 [V] system voltage, which was calculated based on the 12 [V] system voltage versus the damping torque request value characteristic from the input-output voltage HVBAT (12 [V] system voltage) of the auxiliary battery 4 detected by the auxiliary battery voltage sensor S19 (step ST 7).

If the limit value of damping torque in the motor damping, and the damping torque instruction value are calculated, then in the MOTECU 33, the FI/AT/MGECU 36 executes the motor damping approval determination by determining whether the damping torque instruction value is less than the limit value of the damping torque or not (step ST 8).

If the damping torque instruction value is more than the limit value of the damping torque (NO in step ST 8), the flow proceeds to step ST 2, and the FI/AT/MGECU 36 determines "motor damping is not possible" in the motor damping approval determination, and executes the all cylinders operation of the internal-combustion engine E (step ST 2).

On the other hand, if the damping torque instruction value is less than the limit value of the damping torque (YES in step ST 8), the FI/AT/MGECU 36 determines "motor damping is possible" in the motor damping approval determination, and executes the cylinder deactivation operation of the internal-combustion engine E (step ST 9), and the MOTECU 33 executes the motor damping using the motor M (step ST 10). The motor damping using the motor M will be described later.

(Motor Damping Processing)

Figure 3:
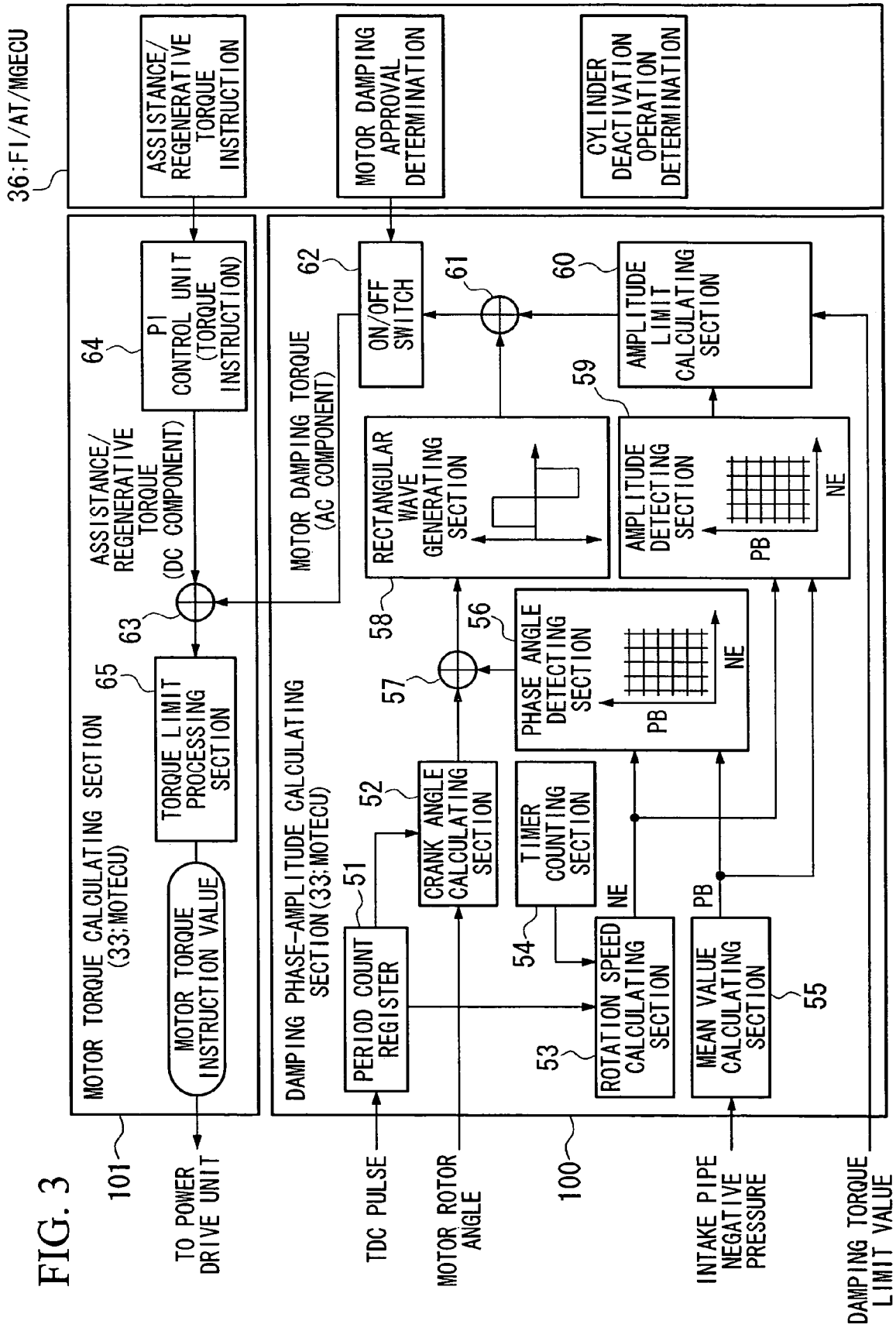
FIG. 3 is a control block diagram for motor damping by the control unit in the control apparatus for a hybrid vehicle of the same embodiment.

Next is a description of the detail of the motor damping using the motor M, executed in step ST 10 of the motor damping necessity determination processing shown in FIG. 2. FIG. 3 is a control block diagram of the motor damping by the MOTECU 33.

In FIG. 3, the construction is such that the control block of the motor damping by the MOTECU 33 comprises; a damping phase-amplitude calculating section 100 provided with: a period count register 51, a crank angle calculating section 52, a rotation speed calculating section 53, a timer counting section 54, a mean value calculating section 55, a phase angle detecting section 56, a synthesizer 57, a rectangular wave generating section 58, an amplitude detecting section 59, an amplitude limit calculating section 60, a synthesizer 61, and an ON/OFF switch 62; and a motor torque calculating section 101 provided with: a synthesizer 63, a PI control unit 64, and a torque limit processing section 65.

Figure 4:
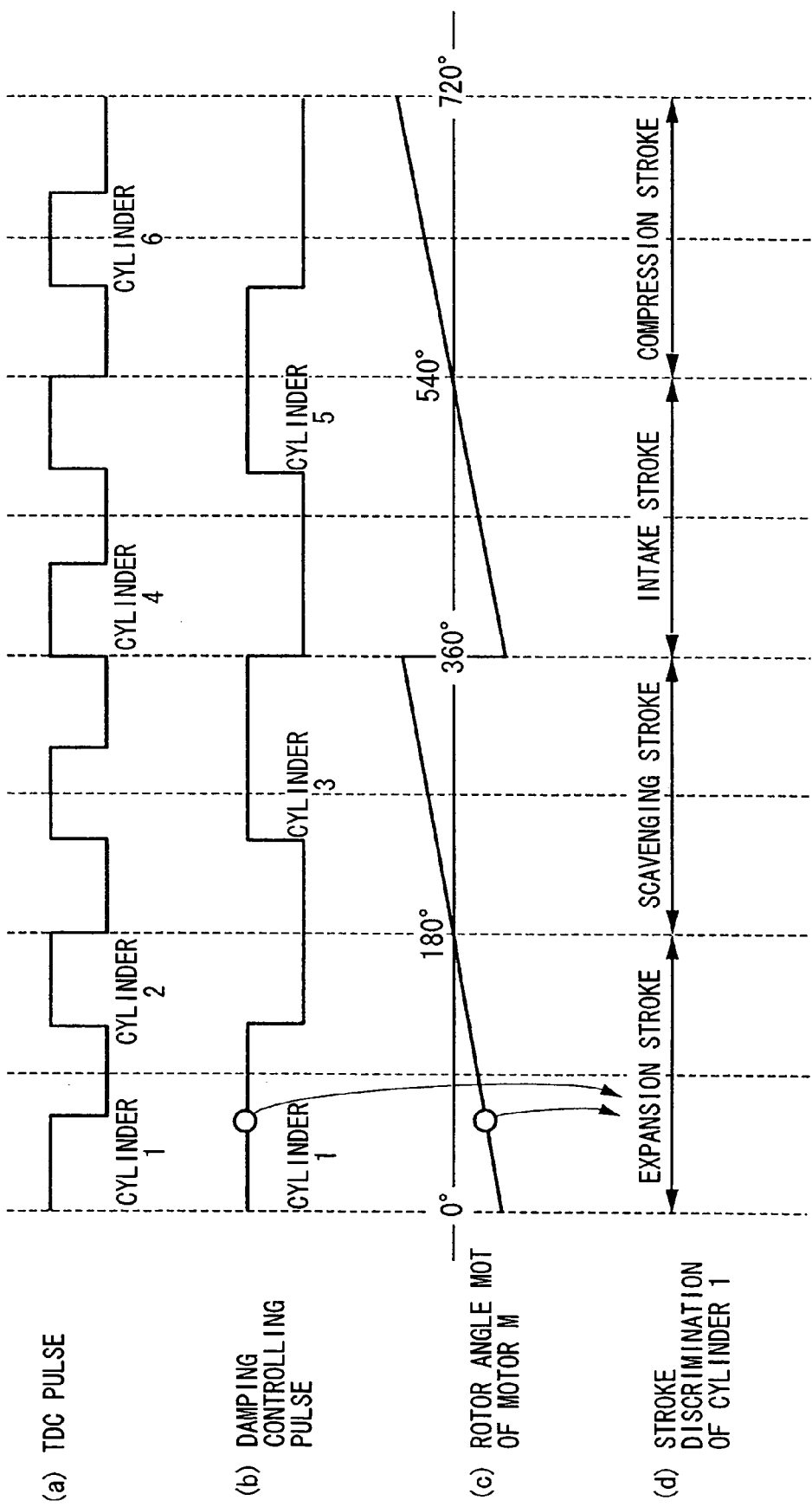
FIG. 4 illustrates a timing calculating method for different strokes of the respective cylinders in the internal-combustion engine E by means of the control unit in the control apparatus for a hybrid vehicle of the same embodiment.

As shown in FIG. 3, firstly, in the period count register 51, the period of the TDC pulse output from the crank angle sensor S15 which detects the compression top dead center position TDC of the piston of the internal-combustion engine E is calculated and input into the crank angle calculating section 52. In the crank angle calculating section 52, from the rotor angle θMOT of the motor M detected by the rotation angle sensor S14 and the period of the TDC pulse calculated by the period count register 51, the crank angle, that is the expansion stroke timing of the respective cylinders in the internal-combustion engine E is calculated. Specifically, as shown in FIG. 4, for example, from "(a) TDC pulse" corresponding to the six cylinder pistons constituting the internal-combustion engine E, is generated "(b) damping controlling pulse" corresponding to the three cylinder pistons during the cylinder deactivation operation where the cylinders 2, 4, and 6 are deactivated. Together with this, by comparing "(c) rotor angle θMOT of the motor M" and the "(b) damping controlling pulse", then for example, as in "(d) stroke discrimination of the cylinder 1", the respective timings of the expansion stroke, the scavenging stroke, the intake stroke, and the compression stroke of the cylinder 1 are calculated. Moreover, in a similar method, the respective timings of the expansion stroke, the scavenging stroke, the intake stroke, and the compression stroke of the cylinders 3 and 5 are calculated.

Furthermore, the rotation speed calculating section 53 counts the TDC pulse fluctuation based on uniformly spaced pulses generated by the timer counting section 54, so as to calculate the engine speed NE of the internal-combustion engine E. Moreover, the mean value calculating section 55 averages the intake pipe negative pressure PB of the internal-combustion engine E representing the engine torque information of the internal-combustion engine E detected by the intake pipe pressure sensor S7, and the phase angle detecting section 56 calculates the optimum phase angle necessary for the damping torque of the motor damping based on a control map defined by the engine speed NE and the intake pipe negative pressure PB.

Accordingly, the timing of the expansion stroke of the internal-combustion engine E calculated by the crank angle calculating section 52, and the optimum phase angle necessary for the damping torque of the motor damping calculated by the phase angle detecting section 56 are synthesized by the synthesizer 57. Based on the synthesized timing and the phase angle, the rectangular wave generating section 58 generates rectangular waves matching with the expansion strokes of the respective operating cylinders of the internal-combustion engine E during the cylinder deactivation operation.

On the other hand, in the amplitude detecting section 59, from the engine speed NE of the internal-combustion engine E calculated by the rotation speed calculating section 53, and the intake pipe negative pressure PB of the internal-combustion engine E averaged by the mean value calculating section 55, and based on the control map defined by the engine speed NE and the intake pipe negative pressure PB, the optimum amplitude necessary for the damping torque of the motor damping is calculated. Moreover, in the amplitude limit calculating section 60, by means of the damping torque limit value calculated in the damping torque limit value calculating processing, the amplitude necessary for the damping torque of the motor damping calculated by the amplitude detecting section 59 is limited. Then, in the synthesizer 61, the rectangular wave generated by the rectangular wave generating section 58 is synthesized with the amplitude output from the amplitude limit calculating section 60, and the damping torque instruction value of the motor damping (AC component of the motor torque) is output to the ON/OFF switch 62 which controls whether the motor damping is executed or not. In the ON/OFF switch 62, if the result of the motor damping approval determination by the FI/AT/MGECU 36 in step ST 8 in the motor damping necessity determination processing is "motor damping possible", the damping torque instruction value of the motor damping (AC component of the motor torque) is output to the synthesizer 63.

Moreover, in the PI control unit 64, according to the torque distribution between the internal-combustion engine E and the motor M calculated by the FI/AT/MGECU 36, from the assistance of the internal-combustion engine E or the regenerative torque instructions of the motor M, the optimum assistance/regenerative torque instruction value (DC component of the motor torque) is calculated by the PI control. In the synthesizer 63, this is then synthesized with the damping torque instruction value of the motor damping (AC component of the motor torque) and the motor torque thus calculated. Then, the calculated motor torque is finally limit processed in the torque limit processing section 65, based on the torque limit value of the motor M prescribed from the temperature of the battery 3 or the temperature of the motor M, and output to the power drive unit 2 as the motor torque instruction value.

Figure 5:
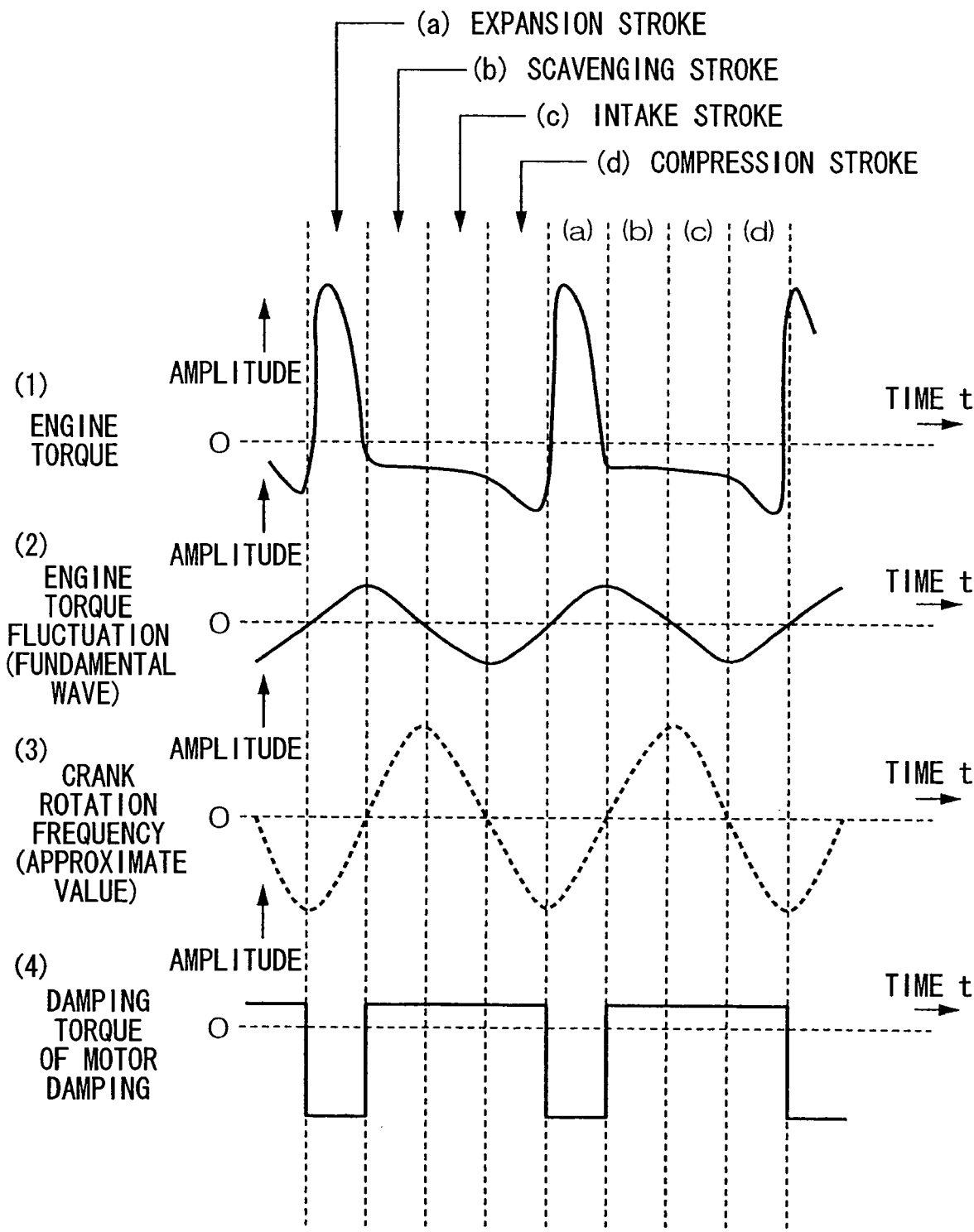
FIG. 5 shows the phases of damping torque of motor damping by the control unit in the control apparatus for a hybrid vehicle of the same embodiment.

Specifically, as shown in FIG. 5, this is described using an example of an arbitrary cylinder. When repeating "(a) expansion stroke", "(b) scavenging stroke", "(c) intake stroke", and "(d) compression stroke", then as shown in FIG. 5 (1), the engine torque peaks in the "(a) expansion stroke" and is hardly generated in the other strokes. Therefore, as shown in FIG. 5 (2), the engine torque fluctuation (fundamental wave) has a period characteristic which peaks between "(a) expansion stroke" and "(b) scavenging stroke". On the other hand, the crank rotation frequency (approximate value) shown in FIG. 5 (3) has a characteristic such that the crank angle rotation frequency increases in the case where the engine torque fluctuation (fundamental wave) shown in FIG. 5 (2) is "positive" and decreases in the case where the engine torque fluctuation (fundamental wave) is "negative". Consequently, the crank rotation frequency (approximate value) shown in FIG. 5 (3) increases from "(a) expansion stroke" to "(b) scavenging stroke". In the motor damping, as shown in FIG. 5 (4), by adding a pulsed regenerative torque counter to the sharp rising of the engine torque in the expansion stroke of the respective cylinders of the internal-combustion engine E, the fluctuation of the crank angle rotation frequency is suppressed.

Incidentally, in the case of performing damping control (motor damping) using the motor M for extending the time of the cylinder deactivation operation of the internal-combustion engine E, then in the zero power control at the battery terminal which balances the input power and the output power of the battery 3 in order to protect the battery 3 from being overcharged or overdischarged, it is necessary to control taking into consideration the power consumption for performing the motor damping.

Figure 6:
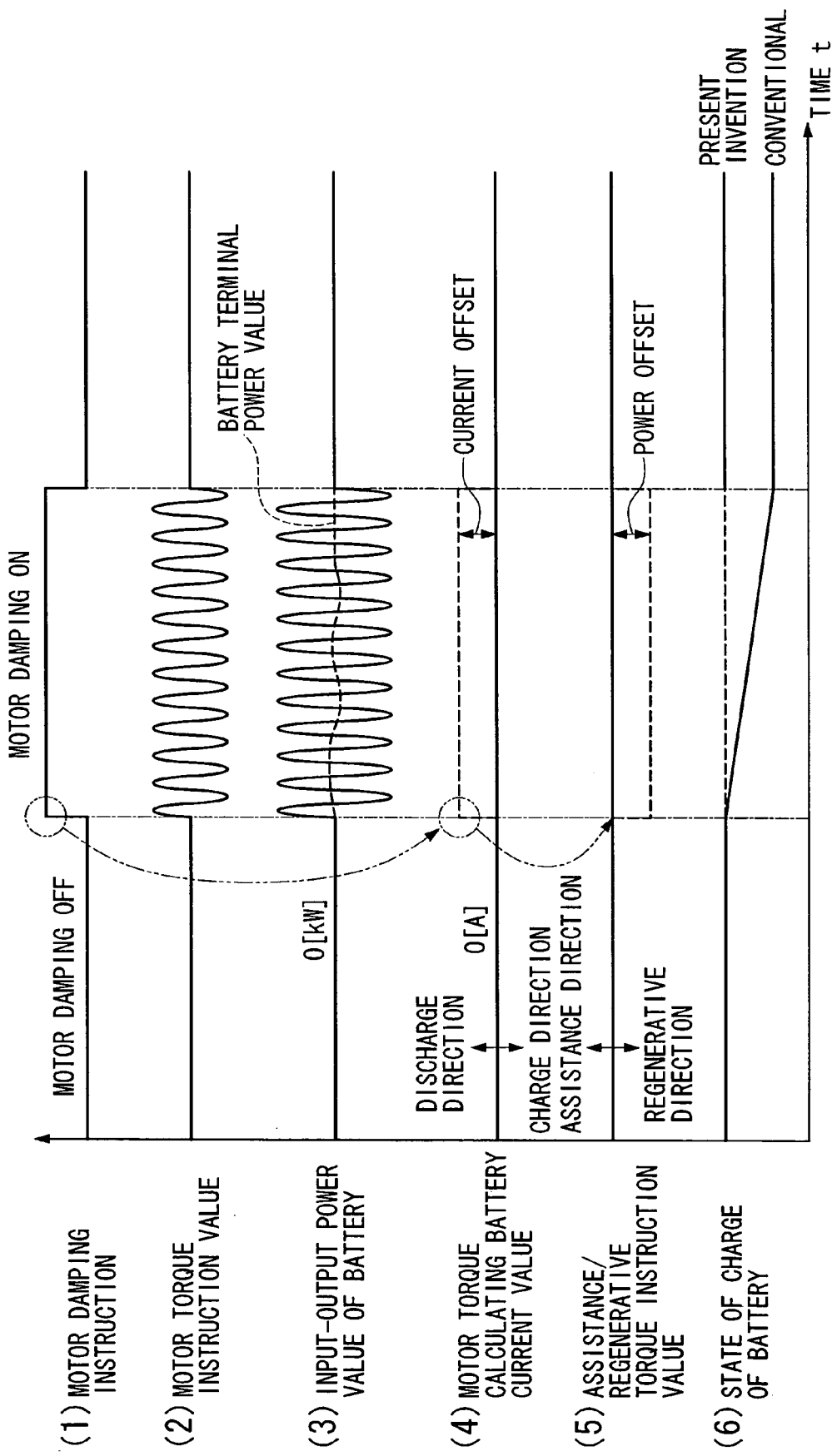
FIG. 6 shows a relation between motor torque calculating battery current value with respect to motor damping torque instructions and state of charge of the battery.

Specifically describing this, FIG. 6 shows the relation between the motor torque calculating battery current value with respect to the motor damping torque instructions and the state of charge of the battery. When the motor damping instructions using the motor M is turned on as shown in FIG. 6 (1), fluctuations for motor damping appear in the motor torque instruction value as shown in FIG. 6 (2).

Moreover, as shown by the solid lines in FIG. 6 (3), corresponding to the fluctuations which appeared for the motor damping in the motor torque instruction value, the fluctuations also appear in the input-output power value.

At this time, it is expected that the power of the battery 3 is consumed in the motor M in order to generate the torque of the motor damping, and the motor torque calculating battery current value obtained by multiplying the input/output current ABAT of the battery 3 in order to perform the zero power control at the battery terminal is detected as the discharge direction. However, as shown by the solid line in FIG. 6 (4), the fluctuations due to the motor damping do not appear in the motor torque calculating battery current value. Therefore, as shown by the solid line in FIG. 6 (5), the assistance/regenerative torque instruction value (DC component of the motor torque) which instructs drive and regeneration from the MOTECU 33 to the motor M, maintains a constant value regardless of the ON/OFF of the motor damping. Therefore, although it is expected that the input power and the output power of the battery 3 are balanced by the zero power control at the battery terminal, the state of charge SOC of the battery 3 is decreased as shown by the solid line in FIG. 6 (6).

Therefore, in the case of performing the motor damping using the motor M, it is necessary to perform the zero power control for the battery terminal, taking into consideration the power consumption for performing the motor damping.

(Zero Power Control Processing)

Next is a description of the zero power control processing for the battery terminal performed taking into consideration the motor damping in order to protect the battery 3 from being overcharged or overdischarged, with reference to the drawings.

Figure 7:
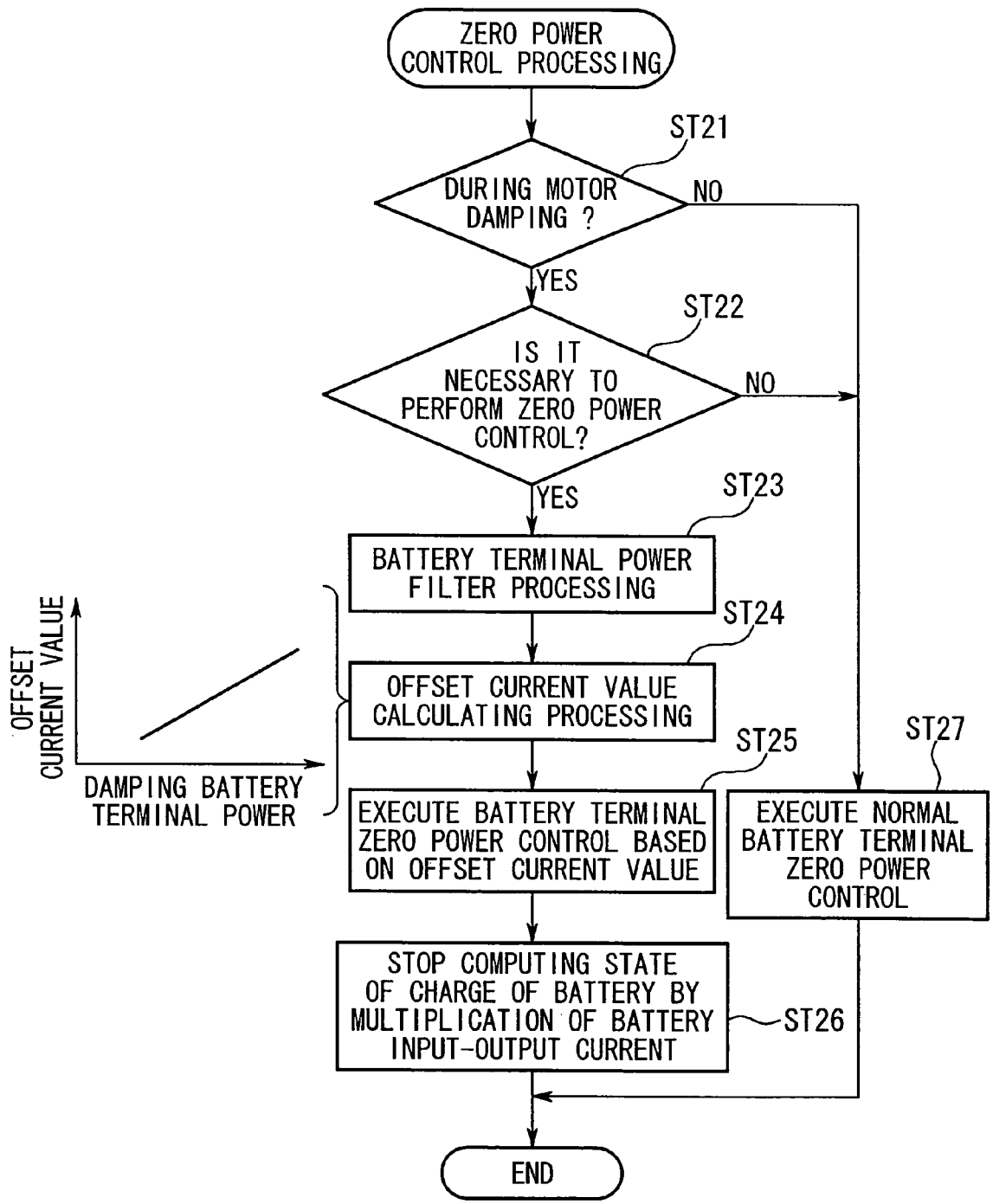
FIG. 7 is a flowchart showing a zero power control processing operation by the control unit of the control apparatus for a hybrid vehicle of the same embodiment.

FIG. 7 is a flowchart showing the zero power control processing operation by the control unit 1 of the control apparatus for a hybrid vehicle of the present embodiment.

In FIG. 7, firstly, the MOTECU 33 determines whether the present time is for motor damping by the motor M or not (step ST 21).

In step ST 21, if the present time is for motor damping by the motor M (YES in step ST 21), the MOTECU 33 determines whether or not it is necessary to perform zero power control which balances the input power and the output power of the battery 3 in order to protect the battery 3 from being overcharged or overdischarged (step ST 22).

In step ST 22, if there is no assistance/regeneration instructions with respect to the motor M or charge instructions of the battery 3 so that it is necessary to perform the zero power control (YES in step ST 22), the MOTECU 33 eliminates the influence of the motor damping from the input-output power value of the battery 3 by filter processing, and performs battery terminal power filter processing which calculates the battery terminal power value for calculating the motor torque for the zero power control shown by solid lines in FIG. 6 (3) (step ST 23). Specifically, the input-output power value of the battery 3 is filter processed by the following equation (1) to calculate the battery terminal power value.

Battery terminal power value=$K$×input-output power value $(t)$+$(1-K)$×input-output power value $(t-1)$ (1)

In equation (1), "input-output power value (t)" and "input-output power value (t−1)" denote the input-output power value of the battery 3 at the time t and the time (t−1). The correction coefficient K is set based on the rotation frequency of the motor M and the damping torque value of the motor damping. Moreover, the motor torque calculating battery terminal current value is calculated from the battery terminal power value and the input-output voltage VBAT of the battery 3.

Next, if the motor torque calculating battery terminal current value can be calculated, the MOTECU 33 calculates the offset current value according to the motor damping for correcting the motor torque calculating battery terminal current value (step ST 24). Specifically, the offset current value is calculated from the following equation (2).

$$\text{Offset current value} = \text{TABLE (damping battery terminal power value)} \times L \quad (2)$$

In equation (2), "TABLE (damping battery terminal power value)" denotes to calculate the offset current value by referencing the table based on the damping battery power versus the offset current value characteristic, and the correction coefficient L is set based on the charging-discharging efficiency of the battery 3 due to the temperature of battery 3. Moreover, the damping battery terminal power value is a value where the input-output power balance (total power amount) of the battery 3 due to the discharge or charge of the motor M, corresponding to one period of the motor torque of the motor M executing the motor damping, is multiplied by the correction coefficient M set based on the damping frequency.

Moreover, if the offset current value corresponding to the motor damping for correcting the motor torque calculating battery terminal current value can be calculated, the MOTECU 33 executes the zero power control which balances the input power and the output power of the battery 3, based on the offset current value (step ST 25). Specifically, as shown by the broken line in FIG. 6 (4), taking into consideration the power consumed in the motor M in order to generate the torque of the motor damping, the current offset in the discharge direction by the calculated offset value is added to the motor torque calculating battery current value obtained by multiplying the input-output current ABAT of the battery 3.

Accordingly, as shown by the broken line in FIG. 6 (5), the regeneration instructions torque (power offset) when the motor damping is turned on is automatically added to the assistance/regenerative torque instruction value (DC component of the motor torque) which instructs drive and regeneration from the MOTECU 33 to the motor M, so that the power consumed in the motor M in order to generate the torque of the motor damping can be compensated. The input power and the output power of the battery 3 are balanced by means of the zero power control for the battery terminal so that, as shown by the broken line in FIG. 6 (6), the state of charge SOC of the battery 3 can be maintained at the constant value.

During the motor damping by the motor M, the MOTECU 33 stops the unnecessary multiplication processing with respect to the input-output current ABAT of the battery 3 including errors due to the motor damping, and stops calculating the state of charge SOC of the battery 3 (step ST 26).

On the other hand, in either one of the case where, in step ST 21 the present time is not for motor damping by the motor M (NO in step ST 21), and the case where, in step ST 22 there is the assistance/regeneration instructions with respect to the motor M or charge instructions for the battery 3 so that it is unnecessary to perform the zero power control (YES in step ST 22), the MOTECU 33 executes the normal zero power control which balances the input power and the output power of the battery 3 based on the input-output current ABAT itself of the battery 3 that is not operating (step ST 27).

In the present embodiment, the MOTECU 33 includes the power control device. Specifically, the processing from step ST 21 to step ST 27 shown in FIG. 7 corresponds to the power control device.

Moreover, the device which stores the power for driving the drive motor is not limited to the battery 3, and any device may be used as long as it is an energy power storage unit including a capacitor which is capable of storing the DC power. Similarly, the device which supplies the respective accessories driven at low voltage, with the low voltage DC power is not limited to the auxiliary battery 4, and any device may be used as long as it is an energy power storage unit (energy storage device) including a capacitor capable of storing the DC power.

As described above, according to the control apparatus for a hybrid vehicle of the present embodiment, in a control apparatus for a hybrid vehicle which is able to travel under the driving force from at least one of the internal-combustion engine E and the drive motor M connected to the internal-combustion engine E, when the FI/AT/MGECU 36 and the MOTECU 33 execute the motor damping which generates the torque for suppressing the torque vibration of the internal-combustion engine in the motor M, the MOTECU 33 corrects the motor torque calculating battery terminal current value obtained by multiplying the input-output current ABAT of the battery 3, by means of the offset value corresponding to the motor damping, and executes the zero power control based on the corrected motor torque calculating battery current value. As a result, the input and output power of the power storage unit can be accurately balanced and the overcharge or overdischarge of the battery 3 based on the input-output current ABAT of the battery 3 including errors due to the damping control or the motor torque calculating battery current value, can be avoided.

Consequently, the effect is obtained where it is possible to realize a control apparatus for a hybrid vehicle wherein the torque vibration of the engine E is suppressed while protecting the battery 3, and deterioration in marketability due to the noise and the vibration caused by the torque vibration of the engine E is prevented.

Figure 8:
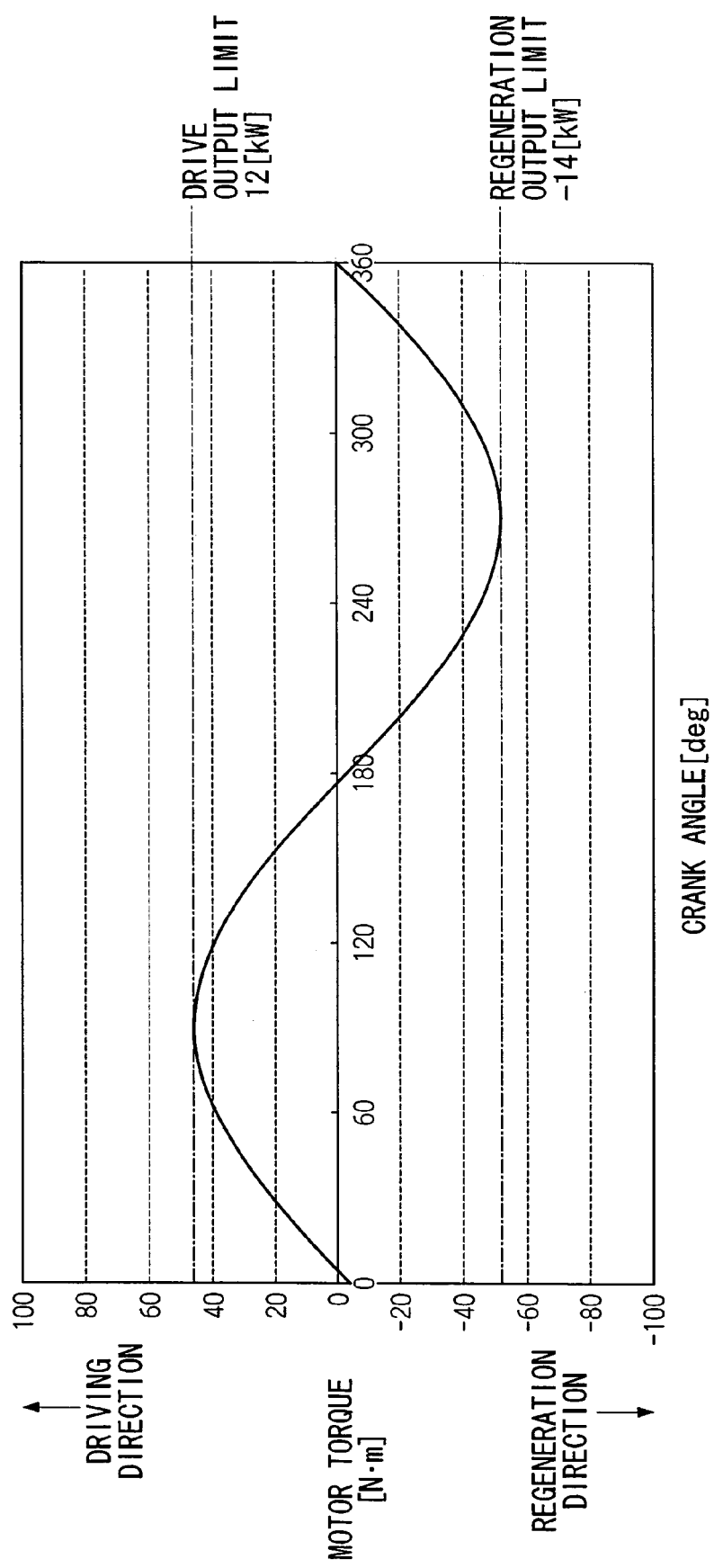
FIG. 8 shows one period of the motor torque for the motor M while executing the motor damping corresponding to an engine speed of 2500 [rpm].

Specifically describing this, for example, FIG. 8 shows one period of the motor torque for the motor M while executing the motor damping corresponding to an engine speed of 2500 [rpm]. As shown in FIG. 8, assuming that the drive side torque maximum value of the motor torque=45.8 [N·m], the drive side output maximum value=12.0 [kW], the regeneration side torque minimum value=−53.4 [N·m], the drive side output maximum value=−14.0 [kW], and the abovementioned power offset value is −3.4 [N·m] (regeneration side), the power balance per one period of the motor torque can be 0 [kW].

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle which is able to travel under the driving force from at least one of an engine and a drive motor connected to said engine, comprising:

a power storage unit which stores power for driving said drive motor;

a damping control device which executes damping control which generates a torque for suppressing torque vibration of said engine, in said drive motor; and a power control device which executes zero power control as applied to the hybrid vehicle which balances an input power and an output power of said power storage unit based on an input-output current value of said power storage unit, when said damping control device executes said damping control.

2. A control apparatus for a hybrid vehicle according to claim 1, wherein said power control device offset corrects the input-output current value of said power storage unit, when said damping control device executes said damping control.

3. A control apparatus for a hybrid vehicle according to claim 1, wherein said power control device stops multiplication processing with respect to the input-output current value of said power storage unit, in the case where there are no charge instructions with respect to said power storage unit, and said damping control device executes said damping control.

* * * * *